(12) United States Patent
Baek et al.

(10) Patent No.: US 12,486,283 B2
(45) Date of Patent: Dec. 2, 2025

(54) CRYSTALLINE SALT OF ERIBULIN

(71) Applicant: YONSUNG FINE CHEMICAL CO., LTD., Hwaseong-si (KR)

(72) Inventors: Areum Baek, Suwon-si (KR); Hyunik Shin, Suwon-si (KR); Yongseo Park, Suwon-si (KR); Seongtaek Kim, Suwon-si (KR); Seunghui Sin, Suwon-si (KR)

(73) Assignee: YONSUNG FINE CHEMICAL CO., LTD., Hwaseong-si (KR)

( * ) Notice: Subject to any disclaimer, the term of this patent is extended or adjusted under 35 U.S.C. 154(b) by 457 days.

(21) Appl. No.: 17/924,792

(22) PCT Filed: May 6, 2021

(86) PCT No.: PCT/KR2021/005638
§ 371 (c)(1),
(2) Date: Nov. 11, 2022

(87) PCT Pub. No.: WO2021/230561
PCT Pub. Date: Nov. 18, 2021

(65) Prior Publication Data
US 2023/0234961 A1    Jul. 27, 2023

(30) Foreign Application Priority Data

May 11, 2020  (KR) .......................... 10-2020-0056200

(51) Int. Cl.
*C07D 493/22* (2006.01)

(52) U.S. Cl.
CPC ........ *C07D 493/22* (2013.01); *C07B 2200/13* (2013.01)

(58) Field of Classification Search
CPC .................................................. C07D 493/22
See application file for complete search history.

(56) References Cited

U.S. PATENT DOCUMENTS

| 6,214,865 B1 | 4/2001 | Littlefield et al. |
| 2017/0100367 A1 | 4/2017 | Asano et al. |
| 2018/0009825 A1 | 1/2018 | Kovi et al. |

FOREIGN PATENT DOCUMENTS

| CN | 105646520 A | 6/2016 |
| CN | 110545808 A | 12/2019 |
| JP | 2016-520662 A | 7/2016 |
| JP | 2017-516802 A | 6/2017 |
| KR | 10-2016-0018531 A | 2/2016 |
| KR | 10-2017-0039096 A | 4/2017 |
| WO | 2017/139664 A1 | 8/2017 |
| WO | 2020/016847 A2 | 1/2020 |
| WO | 2020/110146 A1 | 6/2020 |

OTHER PUBLICATIONS

International Search Report for PCT/KR2021/005638 dated Aug. 9, 2021.
Written Opinion for PCT/KR2021/005638 dated Aug. 9, 2021.
Japanese Patent Office, Communication issued Oct. 3, 2023 in copending Application No. 2022-568571 with Full English translation.
European Patent Office, Communication issued Apr. 15, 2024 in copending Application No. 21 80 4773.
Qin et al., "Salt type selection strategy in research and development of new drugs", Drugs & Clinic, vol. 27 Issue 4, Jul. 2012, pp. 414-417 with English abstract.
Variankaval et al., "From Form to Function: Crystallization of Active Pharmaceutical Ingredients", AIChE Journal, vol. 54, No. 7, Jul. 2008.
Nagase, Latest Medicinal Chemistry, vol. 2, Technomic Co., Ltd., 1999, pp. 347-354.
Ashizawa, "Optimization of salt and crystal form and crystallization Technology", Pharm Tech Japan, 2002, vol. 18, No. 10, pp. 81-96.
Hirayama, Handbook of Organic Compound Crystallization—Principles and Know-how—, Maruzen Co., Ltd., Jul. 25, 2008, pp. 57-84.
Berry et al., "Pharmaceutical cocrystals, salts and multicomponent systems; intermolecular interactions and property based design", Advanced Drug Delivery Reviews, 117, 2017, 3-24.
Chinese Patent Office, Communication issued Jul. 20, 2023 in copending Application No. 202180034385.1.

*Primary Examiner* — Susanna Moore
(74) *Attorney, Agent, or Firm* — Sughrue Mion, PLLC

(57) ABSTRACT

An eribulin salt formed by combining an eribulin free base with a low molecular weight amine compound through a diacid compound is disclosed. As the diacid compound, edisylic acid, 1,5-naphthalenedisulfonic acid, trans-2-butene-1,4-dicarboxylic acid, pyrophosphoric acid, and combination thereof may be employed. As the amine, ammonia, cyclohexylamine, dicyclohexylamine, and a combination thereof may be employed. The eribulin salt can be crystallized by recrystallization to produce a crystalline eribulin salt with increased purity.

14 Claims, 14 Drawing Sheets

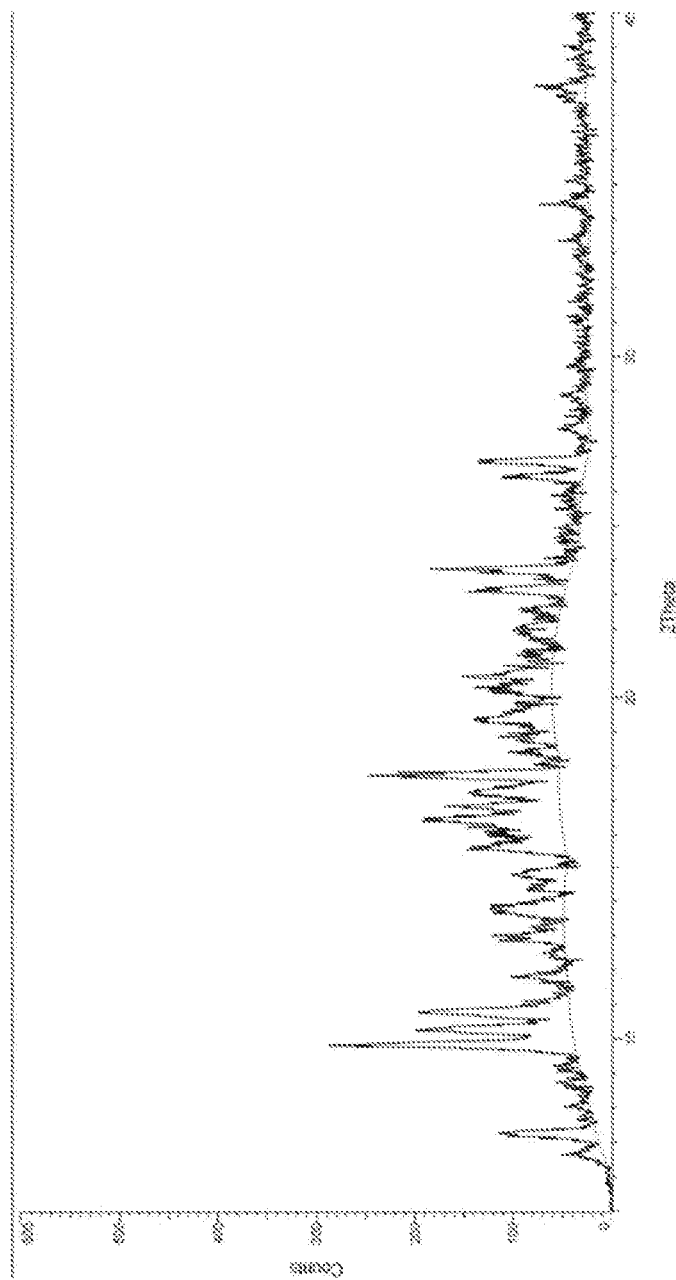
[Fig. 1]

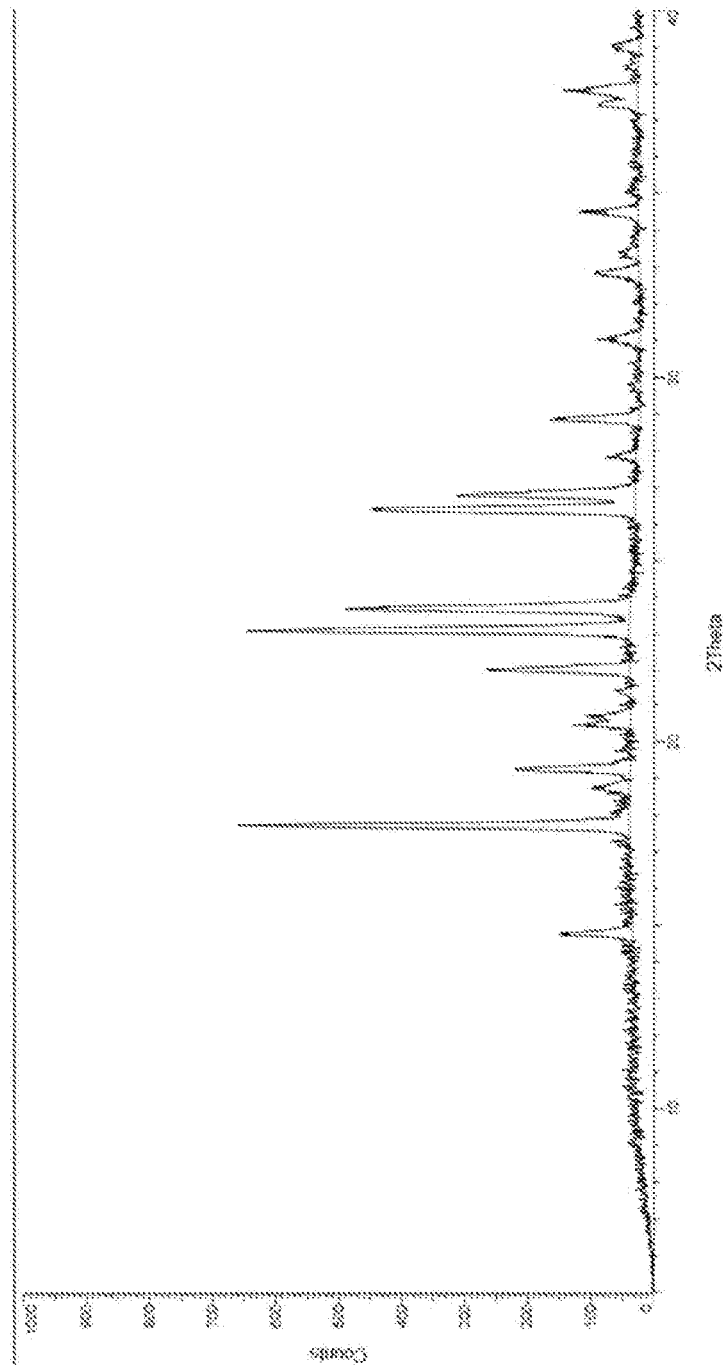
[Fig. 2]

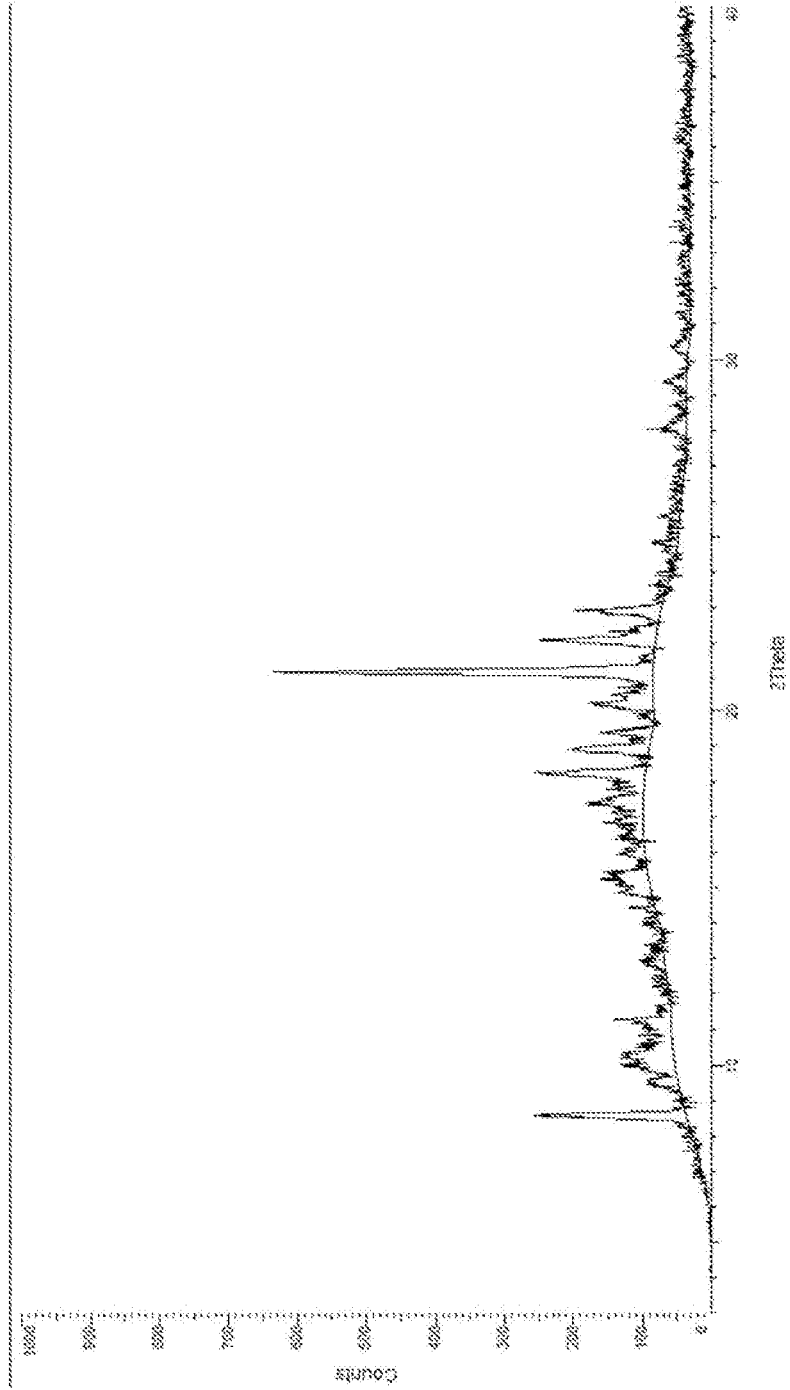
[Fig. 3]

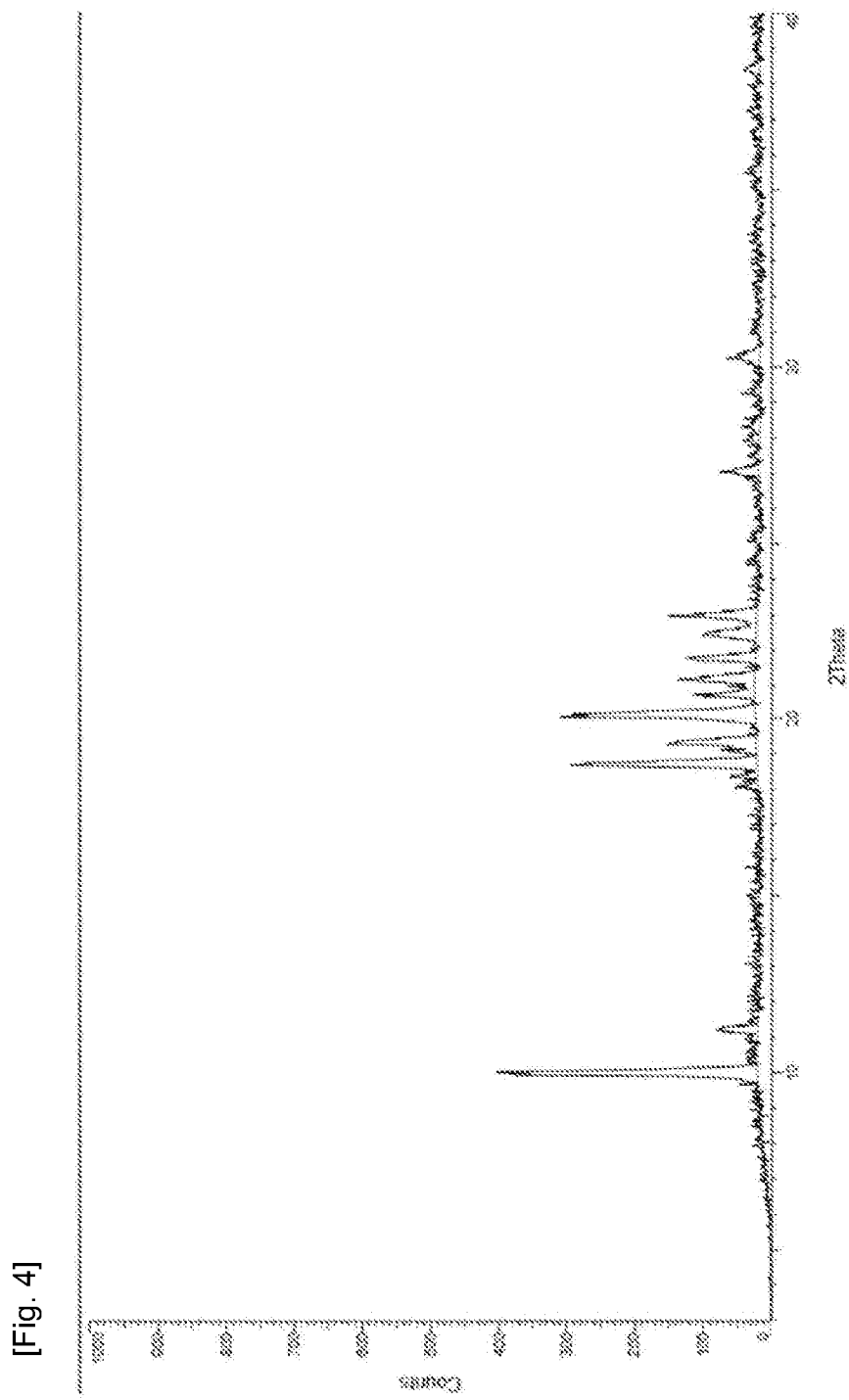
[Fig. 4]

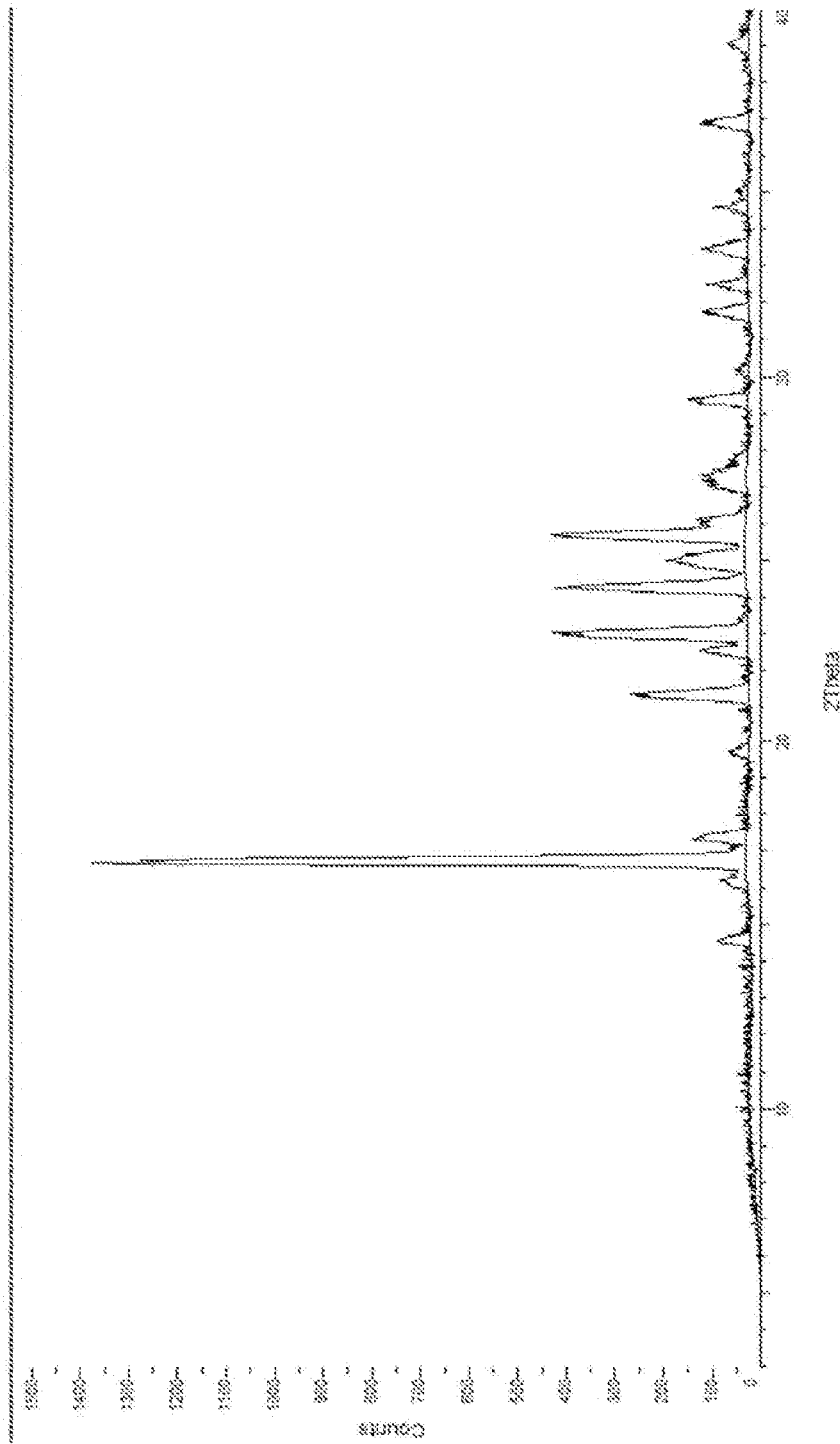
[Fig. 5]

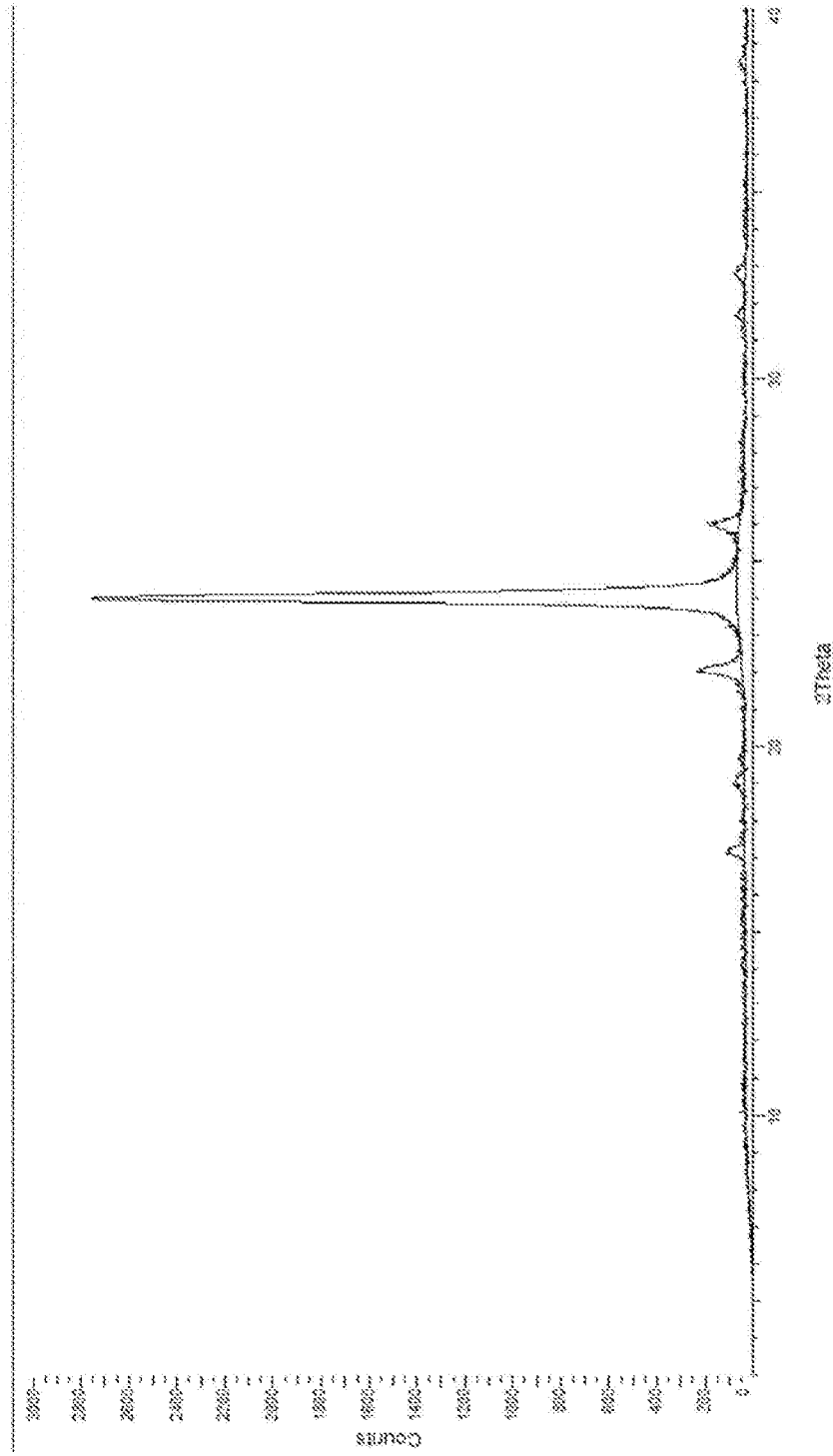
[Fig. 6]

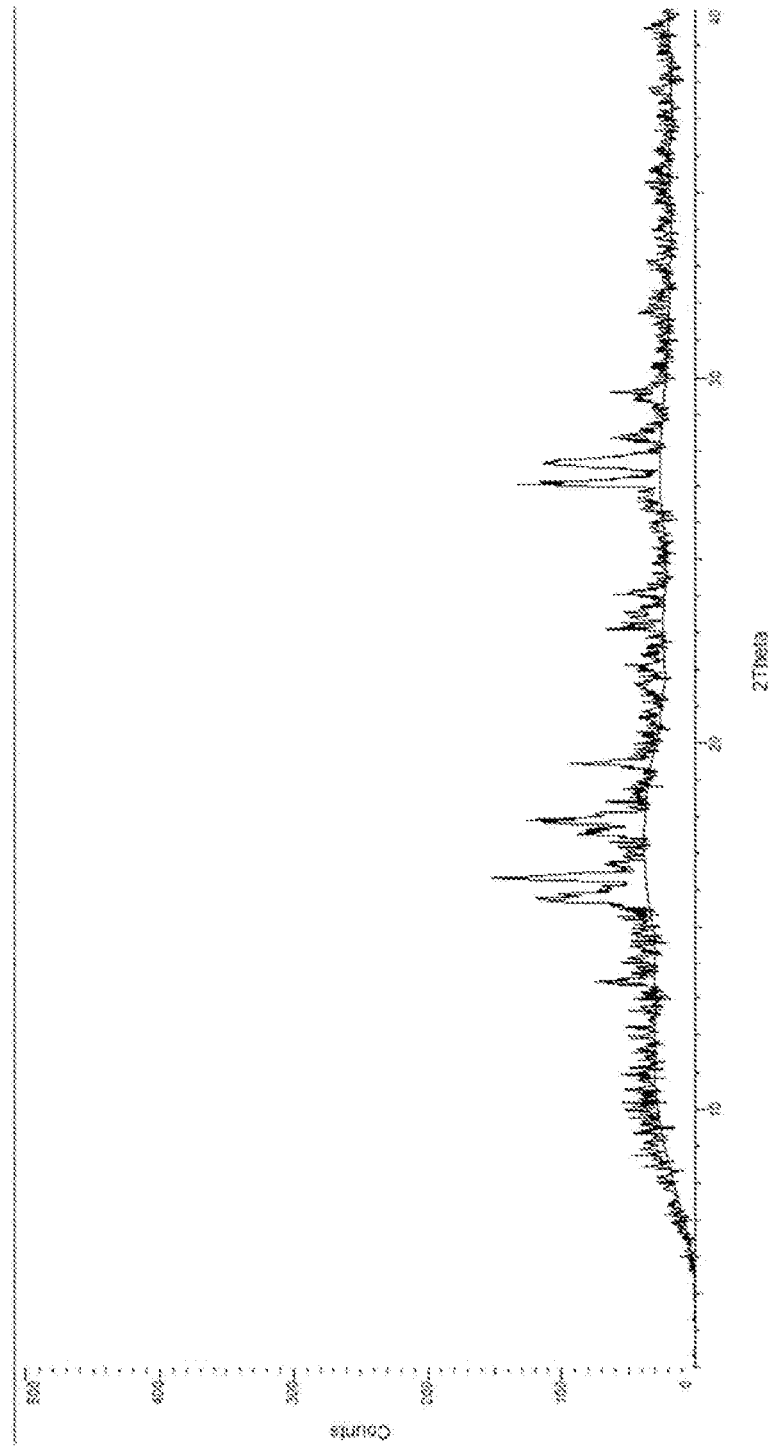
[Fig. 7]

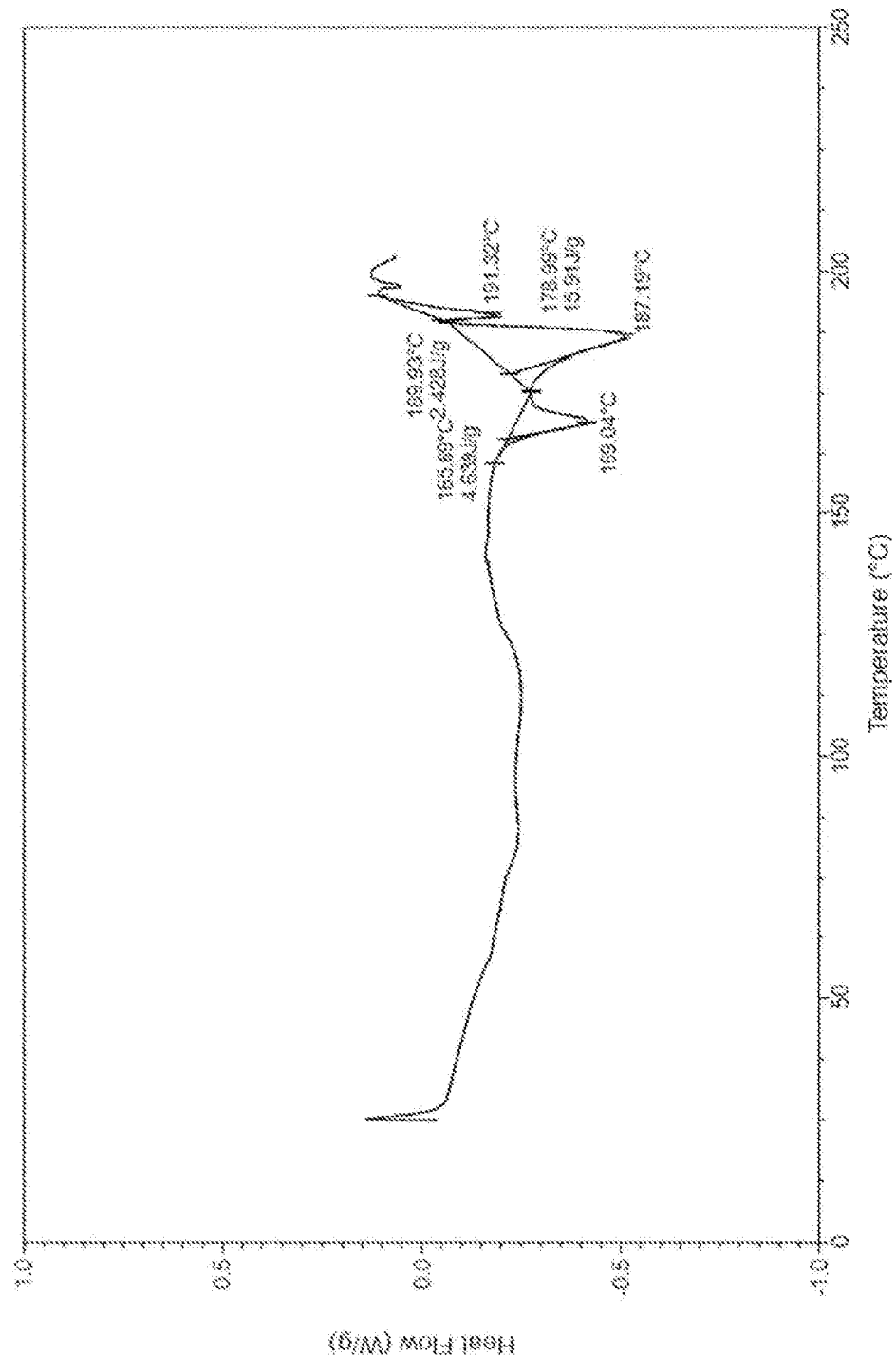

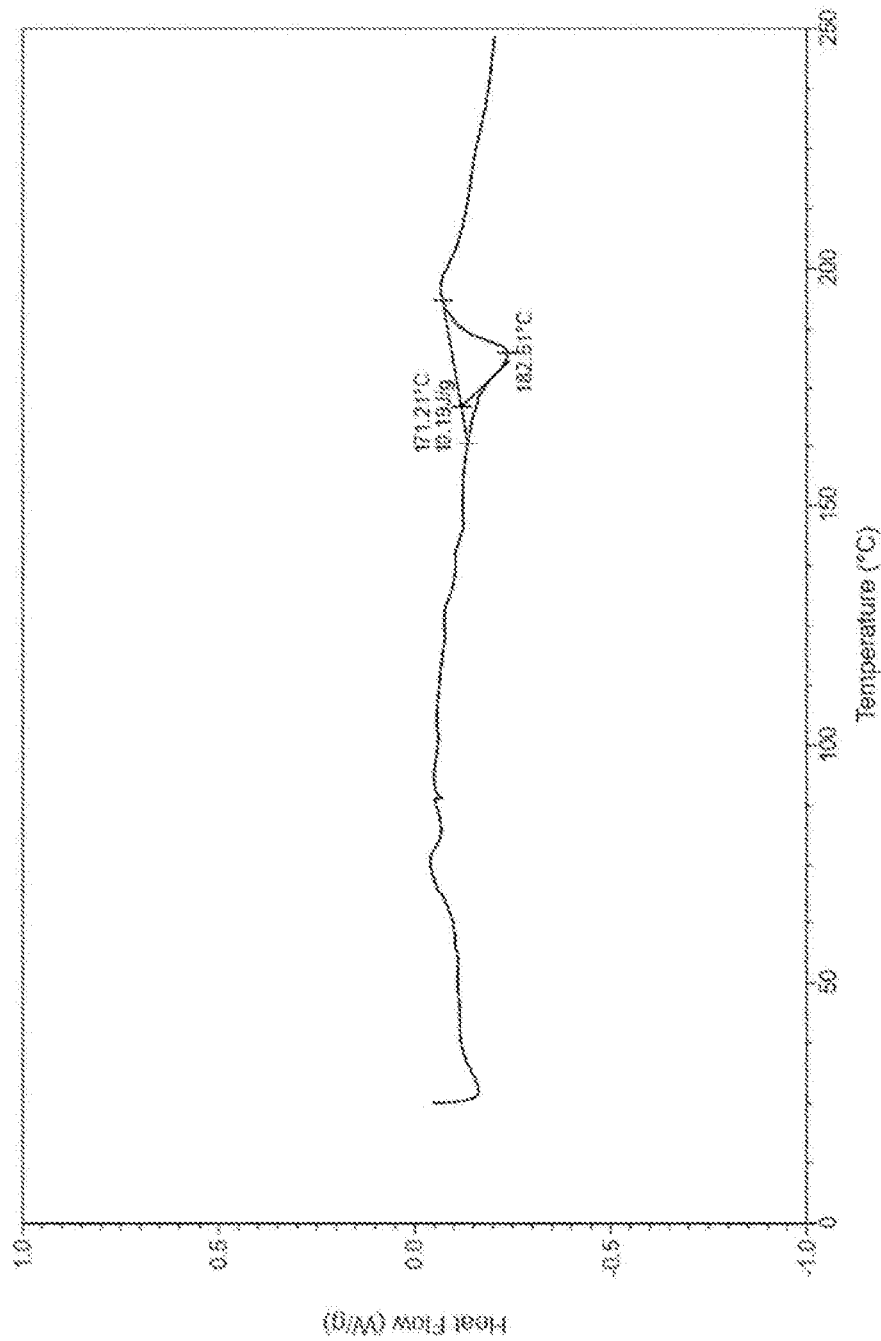
[Fig. 9]

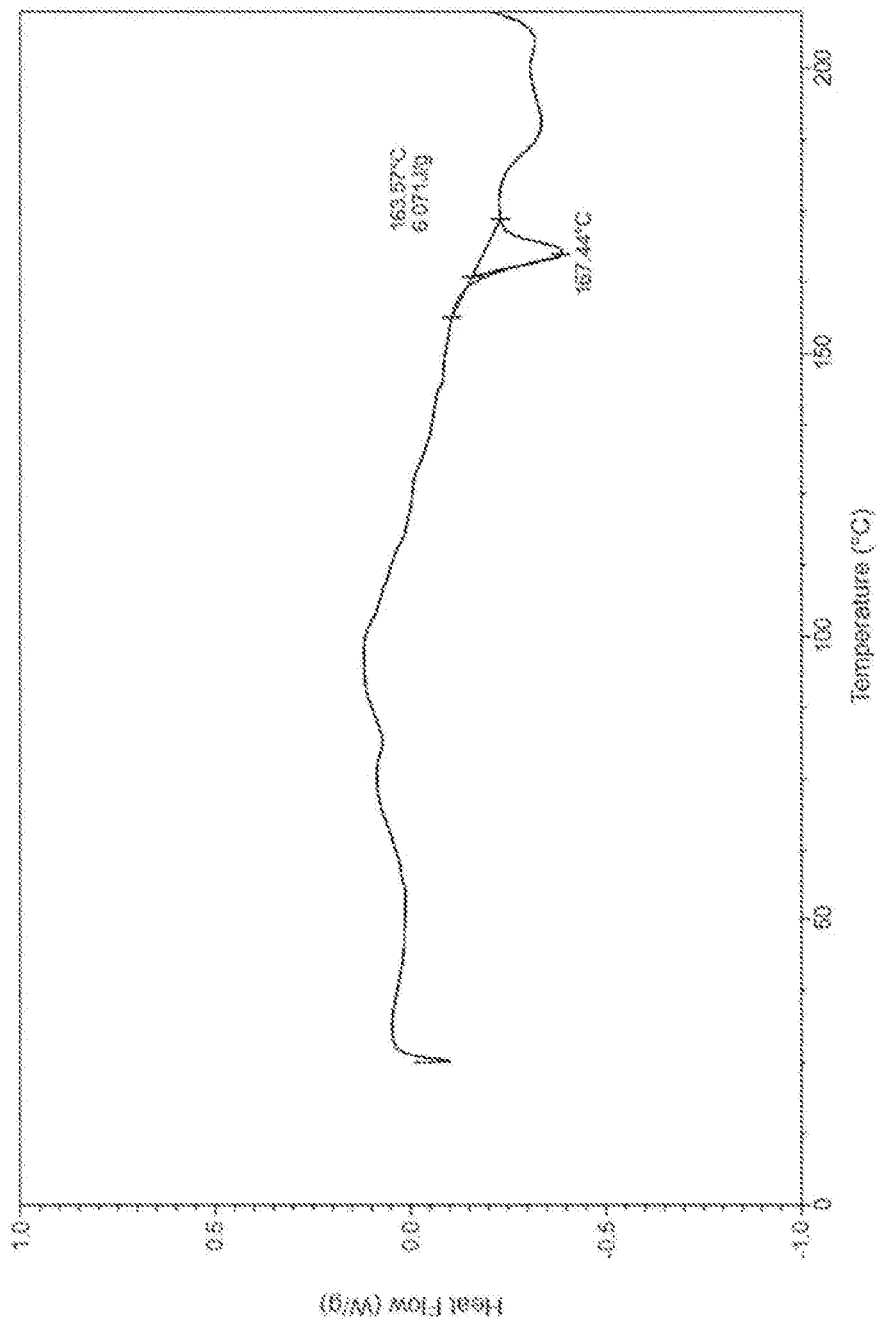
[Fig. 10]

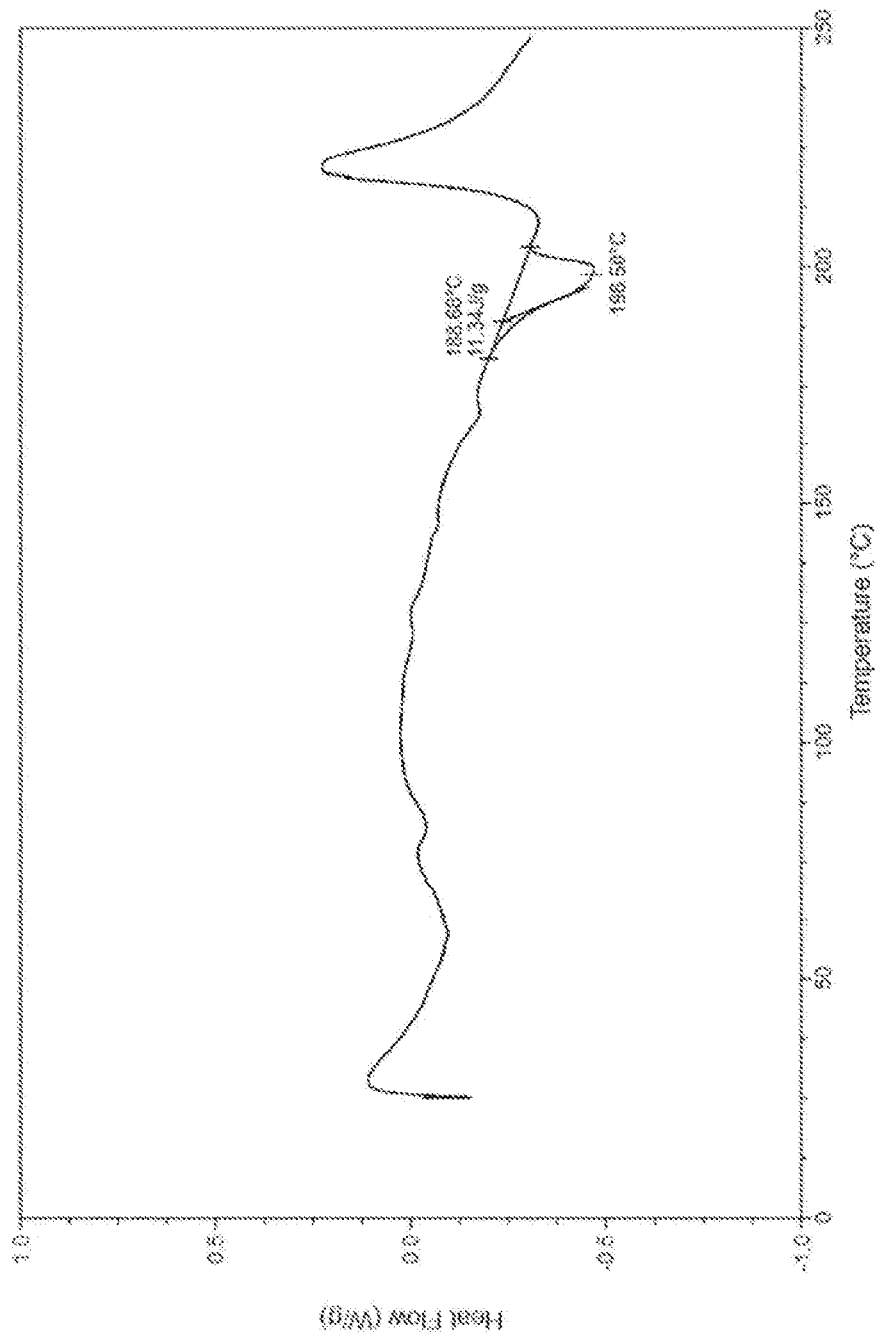
[Fig. 11]

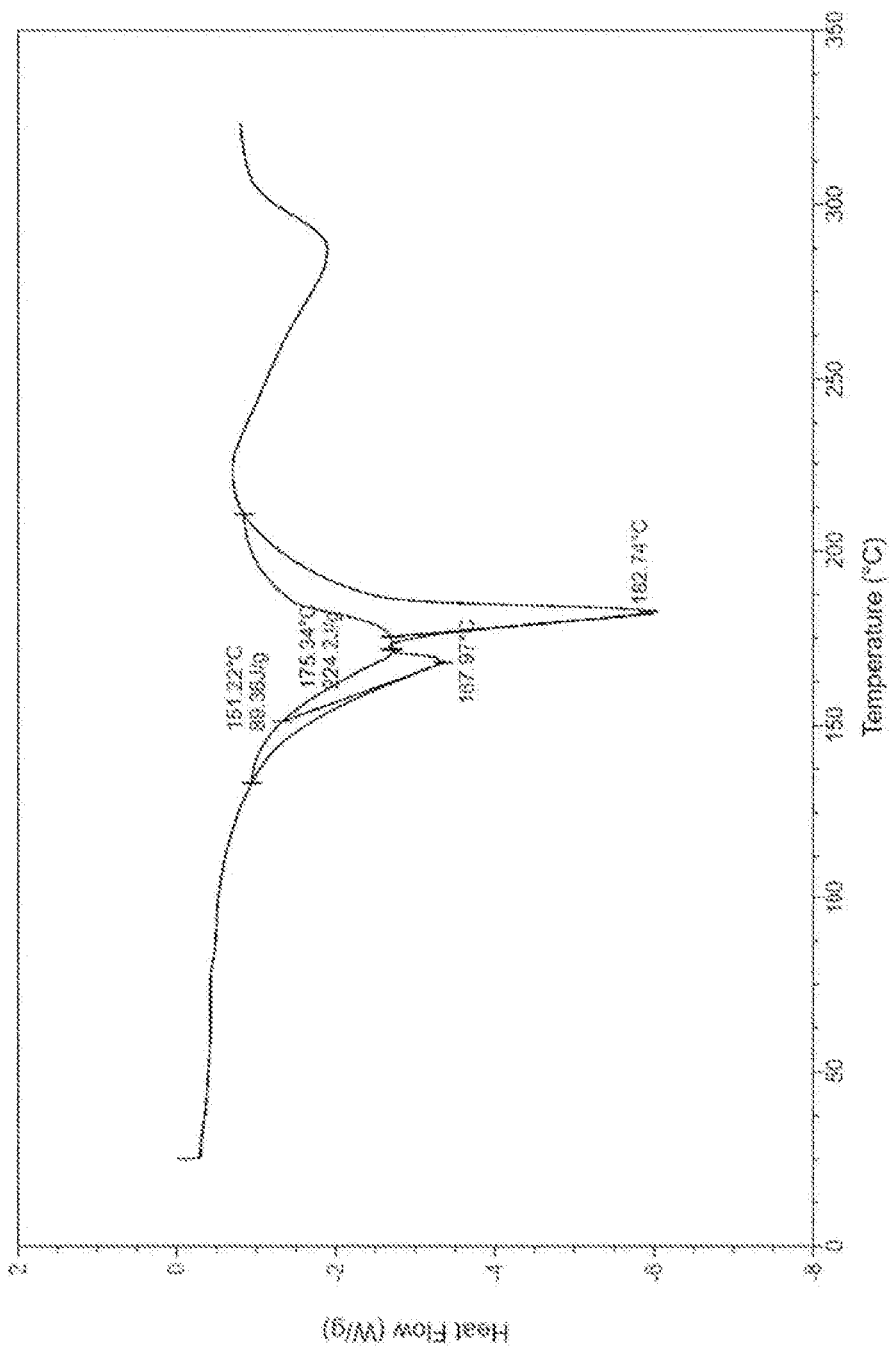
[Fig. 12]

【Fig. 13】
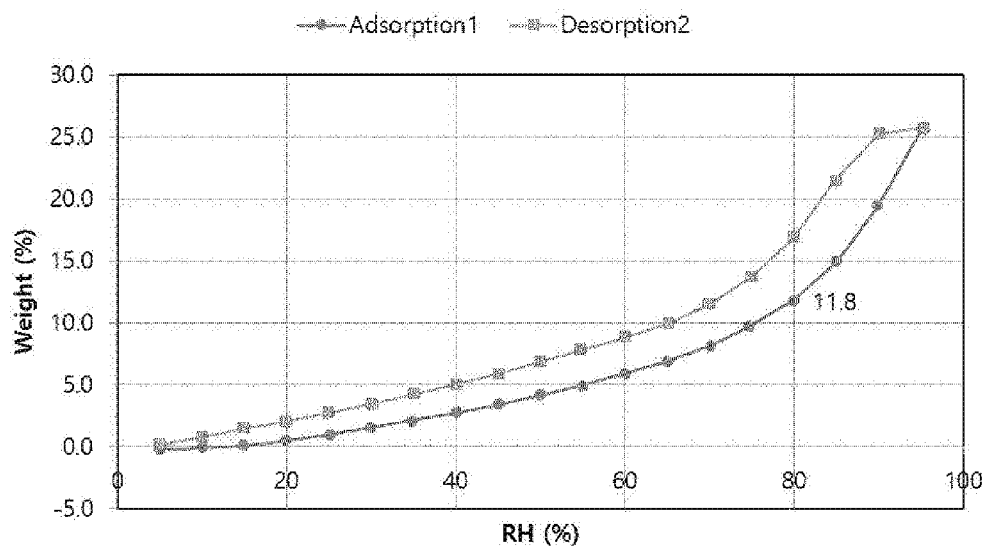
【Fig. 14】
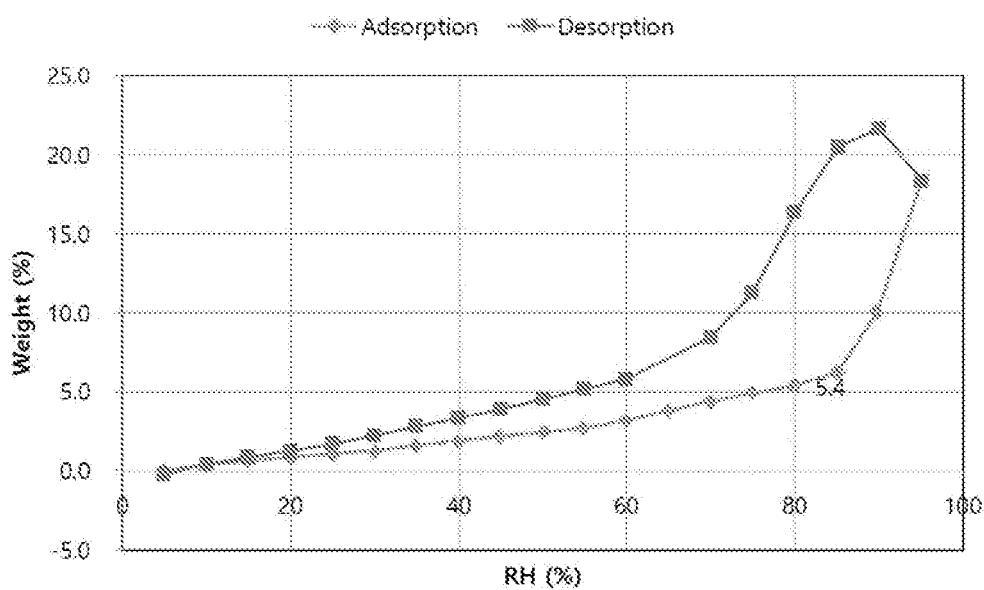

【Fig. 15】
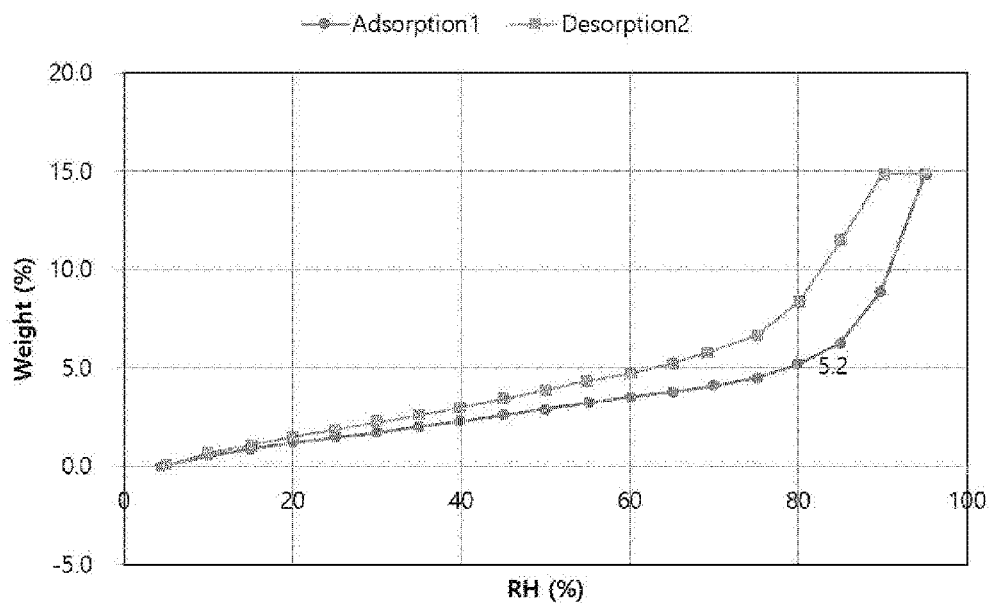
【Fig. 16】
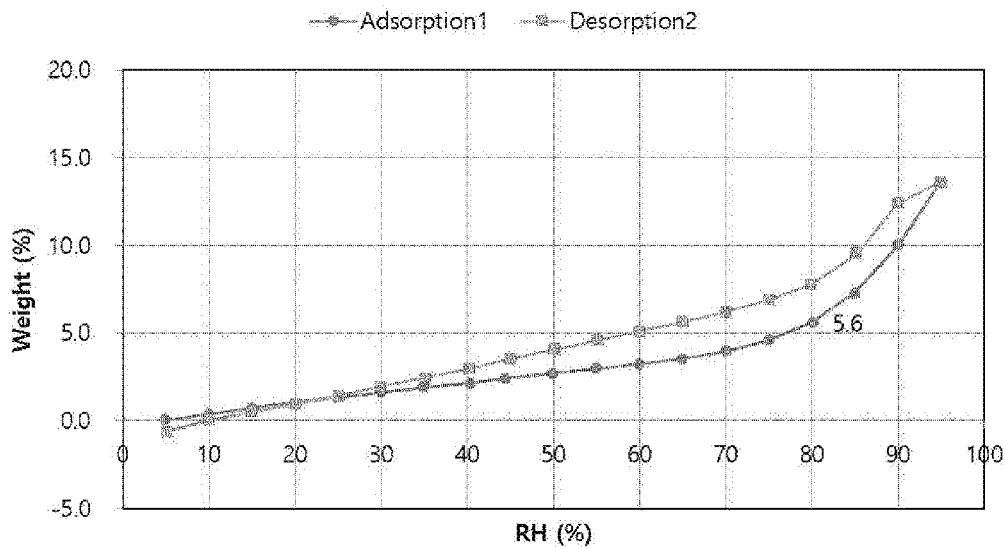

CRYSTALLINE SALT OF ERIBULIN

This Application is a National Stage of International Application No. PCT/KR2021/005638 filed May 6, 2021, claiming priority based on Korean Patent Application No. 10-2020-0056200 filed May 11, 2020.

TECHNICAL FIELD

The present invention relates to a crystalline eribulin salt, and more particularly, to a crystalline eribulin salt formed by combining an eribulin free base with a low molecular weight amine compound such as ammonia through a diacid compound.

BACKGROUND ART

Eribulin mesylate of the following formula (I) is an active component of Halaven, which is used for the treatment of metastatic breast cancer that could not be treated with other chemotherapy.

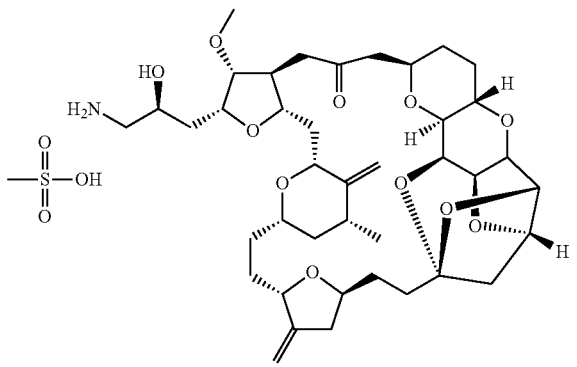
(I)

U.S. Pat. No. 6,214,865 discloses the eribulin mesylate and a method for preparing the same. However, the method produces an amorphous compound and thus there is a limitation in increasing the purity. Further, the amorphous compound has problems such as a low stability and a high hygroscopicity.

Therefore, there has been an urgent need to develop a method for preparing a crystalline eribulin salt in order to solve the above problems, but a crystalline eribulin salt has not been reported yet.

DISCLOSURE

Technical Problem

As a result of intensive research to prepare a crystalline eribulin salt, the present inventors have found that when an eribulin free base is combined with a low molecular weight amine compound such as ammonia through a diacid compound to form a complex salt, crystalline eribulin salts which are easily crystallized by recrystallization can be prepared, and completed the present invention.

Therefore, an object of the present invention is to provide a crystalline eribulin salt.

Another object of the present invention is to provide a method for preparing a high purity eribulin free base by using the eribulin salt.

Another object of the present invention is to provide a method for preparing a high purity eribulin mesylate by using the eribulin salt.

Technical Solution

One embodiment of the present invention relates to an eribulin salt represented by the following formula (I).

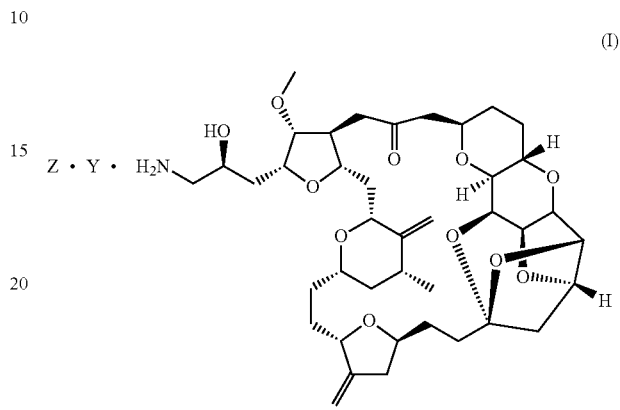
(I)

wherein,
Y represents a diacid compound, and
Z represents an amine compound.

In one embodiment of the present invention, the diacid compound may be represented by the following formula (II).

$$X-R-X \qquad (II)$$

wherein,
R represents a $C_1$-$C_6$ alkylene group, a $C_2$-$C_6$ alkenylene group, an arylene group, or an oxygen atom, and
X represents a sulfonic acid group ($-SO_3H$), a carboxylic acid group ($-COOH$), or a phosphonic acid group ($-PO(OH)_2$).

The amine compound may be represented by the following formula (III).

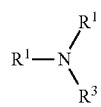
(III)

wherein,
$R^1$, $R^2$ and $R^3$ each independently represent a hydrogen atom, a $C_1$-$C_6$ alkyl group, or a $C_3$-$C_{10}$ cycloalkyl group.

As used herein, the $C_1$-$C_6$ alkylene group refers to a straight-chain or branched divalent hydrocarbon having 1 to 6 carbon atoms, and includes, for example, methylene, ethylene, propylene, butylene, and the like, but is not limited thereto.

As used herein, the $C_2$-$C_6$ alkenylene group refers to a straight-chain or branched divalent unsaturated hydrocarbon having 2 to 6 carbon atoms and one or more carbon-carbon double bonds, and includes, for example, vinylene, propenylene, butenylene, pentenylene, and the like, but is not limited thereto.

As used herein, the arylene group refers to a divalent aromatic hydrocarbon, and includes, for example, phenylene, naphthylene, and the like, but is not limited thereto.

As used herein, the $C_1$-$C_6$ alkyl group refers to a straight-chain or branched monovalent hydrocarbon having 1 to 6 carbon atoms, and includes, for example, methyl, ethyl, n-propyl, i-propyl, n-butyl, i-butyl, t-butyl, n-pentyl, n-hexyl, and the like, but is not limited thereto.

As used herein, the $C_3$-$C_{10}$ cycloalkyl group refers to a simple or fused cyclic hydrocarbon having 3 to 10 carbon atoms, and includes, for example, cyclopropyl, cyclobutyl, cyclopentyl, cyclohexyl, and the like, but is not limited thereto.

In one embodiment of the present invention, the diacid compound may be selected from the group consisting of edisylic acid, 1,5-naphthalenedisulfonic acid, trans-2-butene-1,4-dicarboxylic acid and pyrophosphoric acid, and the amine compound may be selected from the group consisting of ammonia, cyclohexylamine and dicyclohexylamine.

The eribulin salt according to an embodiment of the present invention may be an eribulin edisylate ammonium salt of the following formula (IV) in which the diacid compound is edisylic acid and the amine compound is ammonia.

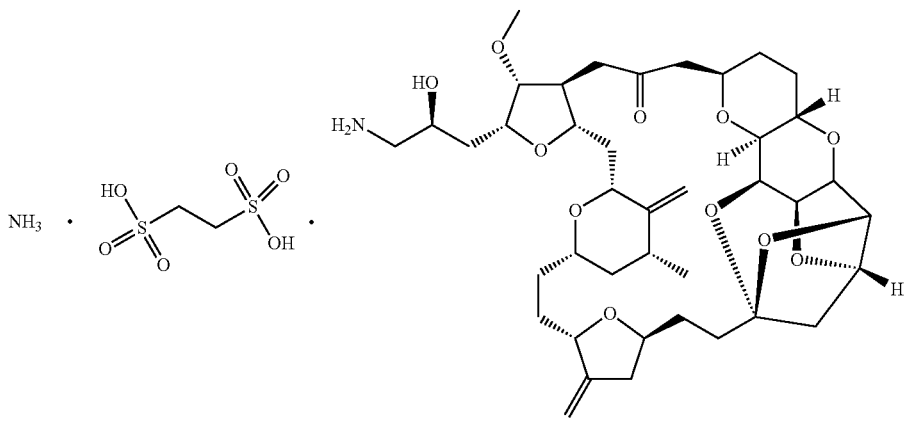

(IV)

The eribulin edisylate ammonium salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 6.7±0.2, 7.3±0.2, 9.8±0.2, 10.3±0.2, 10.8±0.2, 11.8±0.2, 13.0±0.2, 13.7±0.2, 14.4±0.2, 14.8±0.2, 15.6±0.2, 16.1±0.2, 16.4±0.2, 16.8±0.2, 17.2±0.2, 17.7±0.2, 18.4±0.2, 18.9±0.2, 19.3±0.2, 20.3±0.2, 20.6±0.2, 21.2±0.2, 22.1±0.2, 22.6±0.2, 23.1±0.2, 23.7±0.2, 26.4±0.2, 26.9±0.2, 27.8±0.2 and 37.8±0.2 and endothermic points of 169.0, 187.2 and 191.3° C. in differential scanning calorimetry.

In addition, the eribulin edisylate ammonium salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 14.8±0.2, 17.7±0.2, 19.3±0.2, 22.0±0.2, 23.1±0.2, 23.7±0.2, 26.4±0.2, 26.8±0.2, 28.9±0.2, 31.0±0.2, 32.8±0.2, 34.5±0.2 and 37.8±0.2 and an endothermic point of 182.5° C. in differential scanning calorimetry (hereinafter referred to as 'crystalline form I').

The eribulin salt according to an embodiment of the present invention may be an eribulin edisylate cyclohexylamine salt in which the diacid compound is edisylic acid and the amine compound is cyclohexylamine.

The eribulin edisylate cyclohexylamine salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 8.6±0.2, 10.0±0.2, 11.3±0.2, 17.4±0.2, 17.8±0.2, 18.2±0.2, 18.9±0.2, 19.4±0.2, 20.2±0.2, 21.2±0.2, 22.1±0.2 and 22.9±0.2 and an endothermic point of 167.4° C. in differential scanning calorimetry.

The eribulin salt according to an embodiment of the present invention may be an eribulin edisylate dicyclohexylamine salt in which the diacid compound is edisylic acid and the amine compound is dicyclohexylamine.

The eribulin edisylate dicyclohexylamine salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 10.0±0.2, 11.2±0.2, 18.3±0.2, 18.7±0.2, 19.3±0.2, 20.1±0.2, 20.8±0.2, 21.2±0.2, 21.8±0.2, 22.5±0.2, 23.0±0.2 and 27.1±0.2 and an endothermic point of 198.5° C. in differential scanning calorimetry.

The eribulin salt according to an embodiment of the present invention may be an eribulin 1,5-naphthalenedisulfonate ammonium salt in which the diacid compound is 1,5-naphthalenedisulfonic acid and the amine compound is ammonia.

The eribulin 1,5-naphthalenedisulfonate ammonium salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 16.7±0.2, 21.3±0.2, 23.0±0.2, 24.3±0.2, 25.0±0.2, 25.7±0.2 and 29.4±0.2 and an endothermic point of at least 325° C. in differential scanning calorimetry.

The eribulin salt according to an embodiment of the present invention may be an eribulin trans-2-butene-1,4-dicarboxylate ammonium salt in which the diacid compound is trans-2-butene-1,4-dicarboxylic acid and the amine compound is ammonia.

The eribulin trans-2-butene-1,4-dicarboxylate ammonium salt may have a crystalline structure showing an X-ray powder diffraction pattern characterized by peaks at diffraction angles (2θ) of 17.2±0.2, 19.0±0.2, 22.1±0.2, 24.0±0.2, 26.0±0.2, 31.7±0.2, 32.8±0.2 and 38.5±0.2 and endothermic points of 168.0 and 182.7° C. in differential scanning calorimetry.

The eribulin salt according to an embodiment of the present invention may be an eribulin pyrophosphate ammonium salt in which the diacid compound is pyrophosphoric acid and the amine compound is ammonia.

The eribulin pyrophosphate ammonium salt may have a crystalline structure showing an X-ray powder diffraction pattern characterized by peaks having $I/I_0$ values of at least 10% (I is the intensity of each peak; $I_0$ is the intensity of the highest peak) at diffraction angles (2θ) of 13.5±0.2, 15.8±0.2, 16.4±0.2, 17.6±0.2, 17.9±0.2, 19.5±0.2, 22.1±0.2, 23.2±0.2, 24.1±0.2, 27.1±0.2, 27.7±0.2, 28.4±0.2, 29.6±0.2 and 33.1±0.2.

The eribulin salt according to an embodiment of the present invention can be prepared by reacting eribulin free base with a diacid compound and an amine compound in a solvent.

The solvent may be alcohols; nitriles; esters; ketones; hydrocarbons; or a mixture thereof. Specifically, methanol, ethanol, isopropanol, t-butyl alcohol, etc. may be used as the alcohol solvent, and acetonitrile may be used as the nitrile solvent. In addition, the ester solvent may include ethyl acetate, and the like, the ketone solvent may include acetone, methyl ethyl ketone, and the like, and the hydrocarbon solvent may include hexane, and the like. A solvent selected from the group consisting of the combinations thereof, or a mixed solvent of the above solvent and water may be used.

The diacid compound may be used in an amount of 0.5 to 3 equivalents, preferably 0.6 to 1.2 equivalents, based on 1 equivalent of the eribulin free base. In addition, the amine compound may be used in an amount of 0.5 to 6 equivalents, preferably 0.6 to 4 equivalents.

The eribulin salt prepared as described above may be crystallized by recrystallization to produce a crystalline eribulin salt with increased purity.

In particular, the eribulin salt is dissolved in a solvent by heating, a precipitation solvent is added, cooled to room temperature, and the resulting solid is filtered, washed, and dried to obtain a crystalline eribulin salt.

Therefore, the eribulin salt according to the present invention can be effectively used to prepare high purity eribulin free base or eribulin mesylate.

In particular, eribulin free base may be prepared by desalting the eribulin salt according to the present invention, or eribulin mesylate may be prepared by reacting the eribulin free base with mesylic acid.

The desalting and the reaction with mesylic acid can be easily performed by a method known in the art.

Advantageous Effects

The eribulin salt according to the present invention can be crystallized by recrystallization to produce a crystalline eribulin salt with increased purity. Therefore, it is possible to easily prepare high-purity eribulin free base or eribulin mesylate by using the crystalline eribulin salt with increased purity. In addition, the eribulin salt according to the present invention is excellent in terms of transport and storage due to high stability and low hygroscopicity.

BRIEF DESCRIPTION OF FIGURES

FIG. 1 is an X-ray powder diffraction pattern of the eribulin edisylate ammonium salt of Example 2.

FIG. 2 is an X-ray powder diffraction pattern of the eribulin edisylate ammonium salt crystalline form I of Example 3.

FIG. 3 is an X-ray powder diffraction pattern of the eribulin edisylate cyclohexylamine salt of Example 5.

FIG. 4 is an X-ray powder diffraction pattern of the eribulin edisylate dicyclohexylamine salt of Example 7.

FIG. 5 is an X-ray powder diffraction pattern of the eribulin 1,5-naphthalenedisulfonate ammonium salt of Example 9.

FIG. 6 is an X-ray powder diffraction pattern of the eribulin trans-2-butene-1,4-dicarboxylate ammonium salt of Example 11.

FIG. 7 is an X-ray powder diffraction pattern of the eribulin pyrophosphate ammonium salt of Example 13.

FIG. 8 is a differential scanning calorimetry thermogram of the eribulin edisylate ammonium salt of Example 2.

FIG. 9 is a differential scanning calorimetry thermogram of the eribulin edisylate ammonium salt crystalline form I of Example 3.

FIG. 10 is a differential scanning calorimetry thermogram of the eribulin edisylate cyclohexylamine salt of Example 5.

FIG. 11 is a differential scanning calorimetry thermogram of the eribulin edisylate dicyclohexylamine salt of Example 7.

FIG. 12 is a differential scanning calorimetry thermogram of the eribulin trans-2-butene-1,4-dicarboxylate ammonium salt of Example 11.

FIG. 13 is a dynamic vapor adsorption and desorption analysis diagram of eribulin mesylate.

FIG. 14 is a dynamic vapor adsorption and desorption analysis diagram of the eribulin edisylate ammonium salt of Example 2.

FIG. 15 is a dynamic vapor adsorption and desorption analysis diagram of the eribulin edisylate cyclohexylamine salt of Example 5.

FIG. 16 is a dynamic vapor adsorption and desorption analysis diagram of eribulin edisylate dicyclohexylamine salt of Example 7.

BEST MODE

The present invention is further illustrated by the following examples, which are not to be construed to limit the scope of the invention.

The crystalline form of the eribulin salt prepared in Examples below was confirmed by X-ray powder diffraction analysis (XRPD) and differential scanning calorimetry (DSC), and the specific measurement method is as follows.
(1) X-Ray Powder Diffraction Analysis
Diffraction patterns were obtained in the range of 3 to 40° 2θ using a X-ray powder diffractometer, and the X-ray powder diffraction analysis conditions were as follows.
Instrument: BrukerA26X1 D2 Phaser
Time per step: 0.5 s
Scanning method: Continuous PSD fast
Detector: Lynxeye (1D mode)
(2) Differential Scanning Calorimetry (DSC)
Analysis was performed using the Q2000 model of TA instrument. Approximately 2-3 mg of a sample was placed in an aluminum pan and covered with lid having a hole to prepare a sample required for the DSC experiment. After recording the exact weight, it was heated to 25-210° C. under nitrogen at a rate of 10° C./min.

Example 1: Preparation of Eribulin Edisylate Ammonium Salt

Eribulin free base (1 g) was stirred in acetonitrile (12.5 mL) at room temperature, and ethane-1,2-disulfonic acid (0.3 g) was dissolved in 30% aqueous ammonia (4.1 mL) and water (13.5 mL) and added dropwise to the mixture. After stirring for 30 minutes, the resulting solution was distilled under reduced pressure and then azeotroped using acetonitrile to obtain an eribulin edisylate ammonium salt.

Example 2: Recrystallization of Eribulin Edisylate Ammonium Salt

Eribulin edisylate ammonium salt (1 g, purity: 96.3%) obtained in Example 1 was suspended in acetonitrile/water=9:1 (10 mL) and thoroughly dissolved by heating to about 50-60° C. Thereafter, acetonitrile (30 mL) was slowly added dropwise, and upon completion of the addition, the mixture was cooled to room temperature. After cooling, the solid obtained by stirring was washed with acetonitrile. The washed solid was vacuum-dried to obtain an eribulin edisylate ammonium salt (purity: 98.0%) with increased purity. X-ray powder diffraction analysis and differential scanning calorimetry were performed, and the results are shown in FIGS. 1 and 8.

Endothermic point (Differential scanning calorimetry, DSC): 169.0, 187.2, 191.3° C.

TABLE 1

| No. | 2θ | Relative strength (%) |
|---|---|---|
| 1 | 6.668 | 14.9 |
| 2 | 7.254 | 42.5 |
| 3 | 8.044 | 9.3 |
| 4 | 8.701 | 8.4 |
| 5 | 9.202 | 9.9 |
| 6 | 9.826 | 100.0 |
| 7 | 10.273 | 65.1 |
| 8 | 10.786 | 64.9 |
| 9 | 11.808 | 25.0 |
| 10 | 13.006 | 28.3 |
| 11 | 13.738 | 31.5 |
| 12 | 14.379 | 15.2 |
| 13 | 14.770 | 24.1 |
| 14 | 15.646 | 33.3 |
| 15 | 16.065 | 29.1 |
| 16 | 16.443 | 53.7 |
| 17 | 16.828 | 51.2 |
| 18 | 17.239 | 40.4 |
| 19 | 17.735 | 78.8 |
| 20 | 18.430 | 16.7 |
| 21 | 18.897 | 12.0 |
| 22 | 19.348 | 33.0 |
| 23 | 20.277 | 19.7 |
| 24 | 20.622 | 40.0 |
| 25 | 21.235 | 16.5 |
| 26 | 22.081 | 14.8 |
| 27 | 22.551 | 13.2 |
| 28 | 23.127 | 39.2 |
| 29 | 23.725 | 56.8 |
| 30 | 26.424 | 28.2 |
| 31 | 26.872 | 42.3 |
| 32 | 27.825 | 14.1 |
| 33 | 28.881 | 6.6 |
| 34 | 32.881 | 6.9 |
| 35 | 34.462 | 6.8 |
| 36 | 35.107 | 8.4 |
| 37 | 36.537 | 6.9 |
| 38 | 37.549 | 9.9 |
| 39 | 37.829 | 11.2 |
| 40 | 38.986 | 8.8 |

Example 3: Preparation of Eribulin Edisylate Ammonium Salt Crystalline Form I Eribulin edisylate ammonium salt (1 g) obtained in Example 2 was suspended in isopropyl alcohol (20 mL) and then heated and stirred. The resulting solution was cooled to room temperature, filtered, and washed with isopropyl alcohol. The thus-obtained crystals were vacuum-dried and subjected to X-ray powder diffraction analysis and differential scanning calorimetry. The results are shown in Table 2 and FIGS. 2 and 9, and these crystals are referred to as crystalline form I.

Endothermic point (Differential scanning calorimetry, DSC): 182.5° C.

TABLE 2

| No. | 2θ | Relative strength (%) |
|---|---|---|
| 1 | 14.775 | 18.2 |
| 2 | 17.724 | 100 |
| 3 | 18.749 | 6.6 |
| 4 | 19.261 | 29.3 |
| 5 | 20.521 | 8.4 |
| 6 | 20.640 | 9.0 |
| 7 | 21.358 | 3.0 |
| 8 | 22.045 | 36.4 |
| 9 | 23.115 | 93.9 |
| 10 | 23.709 | 65.9 |
| 11 | 26.409 | 67.0 |
| 12 | 26.810 | 44.5 |
| 13 | 27.860 | 4.7 |
| 14 | 28.879 | 20.0 |
| 15 | 31.030 | 10.6 |
| 16 | 32.840 | 10.2 |
| 17 | 33.374 | 2.7 |
| 18 | 34.499 | 13.4 |
| 19 | 37.459 | 9.7 |
| 20 | 37.819 | 19.0 |
| 21 | 39.012 | 6.8 |

Example 4: Preparation of Eribulin Edisylate Cyclohexylamine Salt

Eribulin free base (1 g) was dissolved in acetonitrile (10 mL) at room temperature. Thereafter, cyclohexylamine (0.16 mL) and ethane-1,2-disulfonic acid (0.3 g) were dissolved in water (13.3 mL), added dropwise to the mixture, and stirred for 30 minutes. The resulting solution was distilled under reduced pressure and then azeotroped with acetonitrile to obtain eribulin edisylate cyclohexylamine salt.

Example 5: Recrystallization of Eribulin Edisylate Cyclohexylamine Salt

Eribulin edisylate cyclohexylamine salt (1 g, purity: 97.18%) obtained in Example 4 was suspended in acetonitrile/water=9:1 (6.7 mL) and thoroughly dissolved by heating to about 50-60° C. Thereafter, acetonitrile (40 mL) was slowly added dropwise, and upon completion of the addition, the mixture was cooled to room temperature. After cooling, the solid obtained by stirring was washed with acetonitrile. The washed solid was vacuum-dried to obtain an eribulin edisylate cyclohexylamine salt (purity: 98.99%) with increased purity. X-ray powder diffraction analysis and differential scanning calorimetry were performed, and the results are shown in Table 3, and FIGS. 3 and 10.

Endothermic point (Differential scanning calorimetry, DSC): 167.4° C.

TABLE 3

| No. | 2θ | Relative strength (%) |
|---|---|---|
| 1 | 8.587 | 37.0 |
| 2 | 9.551 | 7.9 |
| 3 | 9.997 | 10.9 |
| 4 | 11.273 | 13.6 |
| 5 | 12.217 | 4.5 |
| 6 | 12.855 | 4.6 |
| 7 | 13.952 | 4.1 |
| 8 | 14.435 | 5.8 |
| 9 | 14.893 | 7.6 |
| 10 | 15.967 | 6.3 |
| 11 | 16.391 | 7.5 |
| 12 | 16.874 | 8.6 |
| 13 | 17.112 | 8.1 |
| 14 | 17.410 | 13.1 |
| 15 | 17.516 | 9.0 |
| 16 | 17.785 | 10.0 |
| 17 | 18.232 | 26.0 |
| 18 | 18.898 | 21.5 |
| 19 | 19.370 | 12.9 |
| 20 | 20.187 | 14.1 |
| 21 | 20.431 | 9.4 |
| 22 | 21.179 | 100.0 |
| 23 | 22.085 | 29.9 |
| 24 | 22.919 | 20.0 |
| 25 | 24.838 | 5.4 |
| 26 | 25.591 | 3.3 |
| 27 | 27.555 | 2.9 |
| 28 | 28.051 | 6.1 |
| 29 | 29.382 | 6.2 |
| 30 | 31.331 | 4.1 |
| 31 | 32.283 | 3.2 |
| 32 | 32.709 | 3.0 |
| 33 | 33.658 | 3.0 |
| 34 | 33.890 | 3.3 |

Example 6: Preparation of Eribulin Edisylate Dicyclohexylamine Salt

Eribulin free base (1 g) was dissolved in acetonitrile (10 mL) at room temperature. Thereafter, dicyclohexylamine (0.28 mL) and ethane-1,2-disulfonic acid (0.3 g) were dissolved in water (13.3 mL), added dropwise to the mixture, and stirred for 30 minutes. The resulting solution was distilled under reduced pressure and then azeotroped with acetonitrile to obtain eribulin edisylate dicyclohexylamine salt.

Example 7: Recrystallization of Eribulin Edisylate Dicyclohexylamine Salt

Eribulin edisylate dicyclohexylamine salt (1 g, purity: 97.21%) obtained in Example 6 was suspended in acetonitrile/water=9:1 (6.7 mL) and thoroughly dissolved by heating to about 50-60° C. Thereafter, acetonitrile (40 mL) was slowly added dropwise, and upon completion of the addition, the mixture was cooled to room temperature. After cooling, the solid obtained by stirring was washed with acetonitrile. The washed solid was vacuum-dried to obtain an eribulin edisylate dicyclohexylamine salt (purity: 98.47%) with increased purity. X-ray powder diffraction analysis and differential scanning calorimetry were performed, and the results are shown in Table 4, and FIGS. 4 and 11.

Endothermic point (Differential scanning calorimetry, DSC): 198.5° C.

TABLE 4

| No. | 2θ | Relative strength (%) |
|---|---|---|
| 1 | 9.997 | 100.0 |
| 2 | 11.234 | 15.9 |
| 3 | 18.114 | 7.5 |
| 4 | 18.340 | 11.0 |
| 5 | 18.712 | 69.6 |
| 6 | 19.331 | 32.4 |
| 7 | 20.110 | 69.3 |
| 8 | 20.751 | 23.1 |
| 9 | 21.197 | 25.0 |
| 10 | 21.788 | 27.3 |
| 11 | 22.473 | 20.1 |
| 12 | 23.003 | 29.2 |
| 13 | 27.067 | 11.9 |
| 14 | 27.975 | 4.1 |
| 15 | 30.297 | 8.6 |
| 16 | 35.549 | 3.5 |
| 17 | 38.420 | 5.7 |

Example 8: Preparation of Eribulin 1,5-naphthalenedisulfonate Ammonium Salt

Eribulin free base (1 g) was dissolved in acetonitrile (12.5 mL) at room temperature. Thereafter, 1,5-naphthalenedisulfonic acid tetrahydrate (0.47 g) was dissolved in 30% aqueous ammonia (4.1 mL) and water (13.5 mL), added dropwise to the mixture, and stirred for 30 minutes. The resulting solution was distilled under reduced pressure and then azeotroped with acetonitrile to obtain eribulin 1,5-naphthalenedisulfonate ammonium salt.

Example 9: Recrystallization of Eribulin 1,5-naphthalenedisulfonate Ammonium Salt Eribulin 1,5-naphthalenedisulfonate ammonium salt (1 g) obtained in Example 8 was dissolved in acetonitrile (3.64 mL) and heated to 40° C. Thereafter, water (1.38 mL) was added dropwise. When the mixture became clear, acetonitrile (13 mL) was added dropwise, and the mixture was cooled to room temperature. After cooling, the solid obtained by stirring was washed with acetonitrile. The washed solid was vacuum-dried to obtain an eribulin 1,5-naphthalenedisulfonate ammonium salt with increased purity. X-ray powder diffraction analysis and differential scanning calorimetry were performed, and the results are shown in Table 5 and FIG. 5.

Endothermic point (Differential scanning calorimetry, DSC): at least 325° C.

TABLE 5

| No. | 2θ | Relative strength (%) |
|---|---|---|
| 1 | 15.587 | 5.6 |
| 2 | 16.172 | 3.5 |
| 3 | 16.725 | 100.0 |
| 4 | 17.373 | 7.6 |
| 5 | 19.703 | 3.4 |
| 6 | 21.334 | 17.5 |
| 7 | 22.535 | 7.1 |
| 8 | 22.997 | 30.7 |
| 9 | 24.270 | 30.9 |
| 10 | 25.004 | 12.3 |
| 11 | 25.674 | 32.7 |
| 12 | 26.032 | 6.9 |
| 13 | 27.122 | 5.6 |
| 14 | 27.235 | 6.5 |
| 15 | 27.729 | 2.8 |
| 16 | 29.358 | 10.3 |

TABLE 5-continued

| No. | 2θ | Relative strength (%) |
|---|---|---|
| 17 | 30.174 | 1.8 |
| 18 | 31.748 | 7.5 |
| 19 | 32.489 | 6.6 |
| 20 | 33.466 | 7.6 |
| 21 | 34.610 | 5.6 |
| 22 | 36.896 | 7.6 |
| 23 | 39.046 | 3.1 |

Example 10: Preparation of Eribulin trans-2-butene-1,4-dicarboxylate Ammonium Salt Eribulin free base (1 g) was dissolved in acetonitrile (12.5 mL) at room temperature. Thereafter, trans-2-butene-1,4-dicarboxylic acid (0.19 g) was dissolved in 30% aqueous ammonia (4.1 mL) and water (13.5 mL), added dropwise to the mixture, and stirred for 30 minutes. The resulting solution was distilled under reduced pressure and then azeotroped with acetonitrile to obtain eribulin trans-2-butene-1,4-dicarboxylate ammonium salt.

Example 11: Recrystallization of Eribulin trans-2-butene-1,4-dicarboxylate Ammonium Salt Eribulin trans-2-butene-1,4-dicarboxylate ammonium salt (1 g) obtained in Example 10 was suspended in isopropanol (3.81 mL) and heated to 40° C. Thereafter, water (0.91 mL) was added dropwise. When the mixture became clear, acetonitrile (13.7 mL) was added dropwise, and the mixture was cooled to room temperature. After cooling, the solid obtained by stirring was washed with acetonitrile. The washed solid was vacuum-dried to obtain an eribulin trans-2-butene-1,4-dicarboxylate ammonium salt with increased purity. X-ray powder diffraction analysis and differential scanning calorimetry were performed, and the results are shown in Table 6 and FIGS. 6 and 12.

Endothermic point (Differential scanning calorimetry, DSC): 168.0 and 182.7° C.

TABLE 6

| No. | 2θ | Relative strength (%) |
|---|---|---|
| 1 | 17.189 | 2.5 |
| 2 | 19.026 | 1.4 |
| 3 | 22.058 | 6.3 |
| 4 | 24.013 | 100.0 |
| 5 | 25.980 | 3.9 |
| 6 | 31.725 | 1.1 |
| 7 | 32.819 | 1.8 |
| 8 | 38.502 | 0.9 |

Example 12: Preparation of Eribulin Pyrophosphate Ammonium Salt

Eribulin free base (1 g) was dissolved in acetonitrile (12.5 mL) at room temperature. Thereafter, pyrophosphoric acid (0.24 g) was dissolved in 30% aqueous ammonia (4.1 mL) and water (13.5 mL), added dropwise to the mixture, and stirred for 30 minutes. The resulting solution was distilled under reduced pressure and then azeotroped with acetonitrile to obtain eribulin pyrophosphate ammonium salt.

Example 13: Recrystallization of Eribulin Pyrophosphate Ammonium Salt

Eribulin pyrophosphate ammonium salt (1 g, purity: 98.16%) obtained in Example 12 was suspended in isopropyl alcohol (20 mL) and heated and stirred. Thereafter, the mixture was cooled to room temperature, washed with isopropyl alcohol, and then vacuum-dried to obtain an eribulin pyrophosphate ammonium salt (purity: 98.48%) with increased purity. X-ray powder diffraction analysis was performed, and the results are shown in Table 7 and FIG. 7.

TABLE 7

| No. | 2θ | Relative strength (%) |
|---|---|---|
| 1 | 13.456 | 32.6 |
| 2 | 15.800 | 75.3 |
| 3 | 16.356 | 100.0 |
| 4 | 17.601 | 39.6 |
| 5 | 17.893 | 63.9 |
| 6 | 19.457 | 53.0 |
| 7 | 22.056 | 16.2 |
| 8 | 23.162 | 28.9 |
| 9 | 24.069 | 26.5 |
| 10 | 27.066 | 79.5 |
| 11 | 27.688 | 89.6 |
| 12 | 28.381 | 20.6 |
| 13 | 29.579 | 38.4 |
| 14 | 33.112 | 17.7 |

Experimental Example 1: Stability Test

In order to evaluate the moisture and thermal stability of the eribulin edisylate ammonium salt obtained in Example 2 and amorphous eribulin mesylate, the active component of commercially available Halaven, 20 mg each was placed in a screwcap amber vial and sealed, and stored at 40±2° C., 75±5% RH. After 2 weeks and 4 weeks of storage, the occurrence and increase of related substances in each sample were evaluated by high-performance liquid chromatography, and changes were confirmed by X-ray powder diffraction analysis and differential scanning calorimetry to evaluate stability.

No change in properties of the eribulin edisylate ammonium salt was observed during the stability test period. However, in the case of eribulin mesylate, the solid deliquesced and the color changed to yellow in the 2nd week, and the deliquescent state was maintained and the color changed from yellow to brown in the 4th week.

In addition, as a result of high-performance liquid chromatography analysis for confirming related substances, the eribulin edisylate ammonium salt obtained in Example 2 showed a small increase in related substances resulting in a decrease in purity within about 0.5% during 4 weeks of the stability test period as shown in Table 8 below. On the other hand, the purity of eribulin mesylate decreased to 7% in the 4th week due to the increase in related substances. Therefore, it was confirmed that the eribulin edisylate ammonium salt of Example 2 exhibited excellent stability to heat and humidity up to 4 weeks compared to the stability of the amorphous eribulin mesylate.

TABLE 8

| Time (week) | Eribulin edisylate ammonium salt | Eribulin mesylate |
|---|---|---|
| 0 | 99.73% | 99.66% |
| 2 | 99.50% | 88.00% |
| 4 | 99.35% | 7.30% |

In addition, the X-ray powder diffraction analysis results are shown in Table 9 below. As shown in Table 9 below, eribulin mesylate was initially an amorphous solid, but deliquescence was observed over time in the stability test.

TABLE 9

| Time (week) | Eribulin edisylate ammonium salt | Eribulin mesylate |
|---|---|---|
| 0 | crystalline | amorphous |
| 2 | maintain | deliquescence |
| 4 | maintain | deliquescence |

The stability test results showed that the crystalline form of eribulin edisylate ammonium salt was more stable to heat and humidity than eribulin mesylate, which is the active component of commercially available Halaven.

Experimental Example 2: Hygroscopicity Test

Eribulin edisylate obtained in Examples 2, 5, and 7 and the amorphous eribulin mesylate, which is the active component of commercially available Halaven, were subjected to hygroscopicity test by repeating moisture adsorption and desorption once at an interval of 5% RH in an isothermal condition of 25° C. and a relative humidity of 2 to 98% using dynamic vapor adsorption and desorption (DVS) (dynamic vapor adsorption, VTI SGA-100, TA Instruments). The results are shown in Table 10 and FIGS. 13-16.

As a result of the hygroscopicity test, it was confirmed that the amorphous eribulin mesylate showed a rapid weight increase pattern during the hygroscopicity test and its stability to moisture was lowered by adsorption of moisture up to 11.8%. In addition, deliquescence was observed during the test. On the other hand, eribulin edisylate obtained in Examples 2, 5, and 7 showed lower hygroscopicity at 25° C. and 80% RH than the amorphous eribulin mesylate. In addition, it was confirmed that the initial crystalline form was maintained after the test was completed and the eribulin edisylate of Examples 2, 5, and 7 had superior stability to moisture than the amorphous eribulin mesylate.

TABLE 10

| Eribulin salt | Hygroscopicity (EP standard (25° C., 80% RH)) |
|---|---|
| amorphous eribulin mesylate | 11.8% |
| Example 2 | 5.4% |
| Example 5 | 5.2% |
| Example 7 | 5.6% |

The invention claimed is:

1. An eribulin salt represented by the following formula (I):

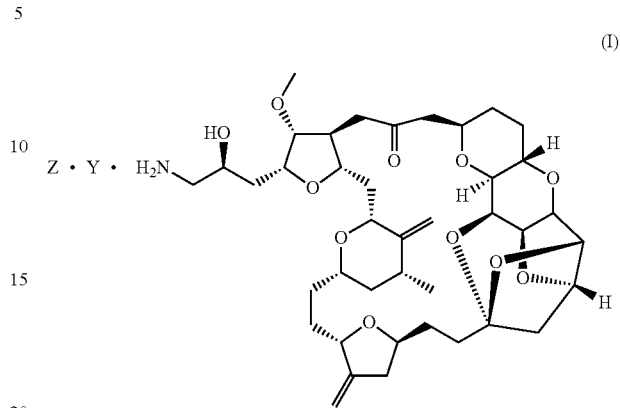

(I)

wherein,

Y represents a diacid compound, and

Z represents an amine compound, wherein the diacid compound is selected from the group consisting of edisylic acid, 1,5-naphthalenedisulfonic acid, trans-2-butene-1,4-dicarboxylic acid and pyrophosphoric acid and wherein the amine compound is selected from the group consisting of ammonia, cyclohexylamine and dicyclohexylamine.

2. The eribulin salt according to claim 1, wherein the diacid compound is edisylic acid and the amine compound is ammonia.

3. The eribulin salt according to claim 2, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 6.7±0.2, 7.3±0.2, 9.8±0.2, 10.3±0.2, 10.8±0.2, 11.8±0.2, 13.0±0.2, 13.7±0.2, 14.4±0.2, 14.8±0.2, 15.6±0.2, 16.1±0.2, 16.4±0.2, 16.8±0.2, 17.2±0.2, 17.7±0.2, 18.4±0.2, 18.9±0.2, 19.3±0.2, 20.3±0.2, 20.6±0.2, 21.2±0.2, 22.1±0.2, 22.6±0.2, 23.1±0.2, 23.7±0.2, 26.4±0.2, 26.9±0.2, 27.8±0.2, and 37.8±0.2.

4. The eribulin salt according to claim 2, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 14.8±0.2, 17.7±0.2, 19.3±0.2, 22.0±0.2, 23.1±0.2, 23.7±0.2, 26.4±0.2, 26.8±0.2, 28.9±0.2, 31.0±0.2, 32.8±0.2, 34.5±0.2 and 37.8±0.2.

5. The eribulin salt according to claim 1, wherein the diacid compound is edisylic acid and the amine compound is cyclohexylamine.

6. The eribulin salt according to claim 5, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 8.6±0.2, 10.0±0.2, 11.3±0.2, 17.4±0.2, 17.8±0.2, 18.2±0.2, 18.9±0.2, 19.4±0.2, 20.2±0.2, 21.2±0.2, 22.1±0.2 and 22.9±0.2.

7. The eribulin salt according to claim 1, wherein the diacid compound is edisylic acid and the amine compound is dicyclohexylamine.

8. The eribulin salt according to claim 7, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 10.0±0.2, 11.2±0.2, 18.3±0.2, 18.7±0.2, 19.3±0.2, 20.1±0.2, 20.8±0.2, 21.2±0.2, 21.8±0.2, 22.5±0.2, 23.0±0.2 and 27.1±0.2.

9. The eribulin salt according to claim 1, wherein the diacid compound is 1,5-naphthalenedisulfonic acid, and the amine compound is ammonia.

10. The eribulin salt according to claim 9, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 16.7±0.2, 21.3±0.2, 23.0±0.2, 24.3±0.2, 25.0±0.2, 25.7±0.2 and 29.4±0.2.

11. The eribulin salt according to claim 1, wherein the diacid compound is trans-2-butene-1,4-dicarboxylic acid, and the amine compound is ammonia.

12. The eribulin salt according to claim 11, wherein the salt shows an X-ray powder diffraction pattern characterized by peaks at diffraction angles (2θ) of 17.2±0.2, 19.0±0.2, 22.1±0.2, 24.0±0.2, 26.0±0.2, 31.7±0.2, 32.8±0.2 and 38.5±0.2.

13. The eribulin salt according to claim 1, wherein the diacid compound is pyrophosphoric acid, and the amine compound is ammonia.

14. The eribulin salt according to claim 13, wherein the salt shows an X-ray powder diffraction pattern characterized by peaks having $I/I_0$ values of at least 10% (I is the intensity of each peak; $I_0$ is the intensity of the highest peak) at diffraction angles (2θ) of 13.5±0.2, 15.8±0.2, 16.4±0.2, 17.6±0.2, 17.9±0.2, 19.5±0.2, 22.1±0.2, 23.2±0.2, 24.1±0.2, 27.1±0.2, 27.7±0.2, 28.4±0.2, 29.6±0.2 and 33.1±0.2.

* * * * *